R. H. AVERY.
Corn-Planter.
No. 202,625. Patented April 23, 1878.
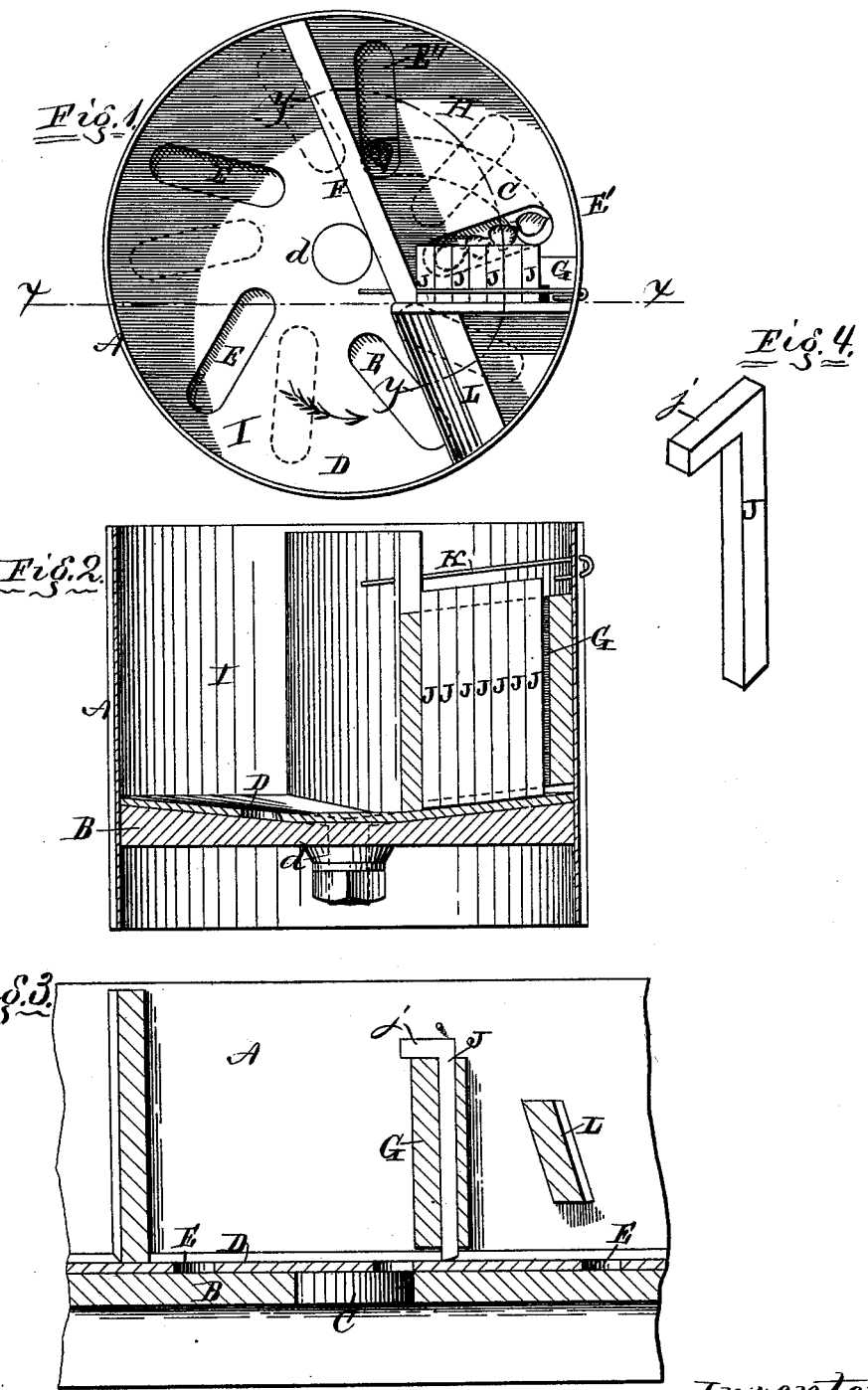

UNITED STATES PATENT OFFICE.

ROBERT H. AVERY, OF GALESBURG, ILLINOIS, ASSIGNOR OF ONE-HALF HIS RIGHT TO CYRUS M. AVERY, OF SAME PLACE.

IMPROVEMENT IN CORN-PLANTERS.

Specification forming part of Letters Patent No. 202,625, dated April 23, 1878; application filed July 28, 1877.

*To all whom it may concern:*

Be it known that I, ROBERT H. AVERY, of Galesburg, in the county of Knox and State of Illinois, have invented certain new and useful Improvements in Rotary Drop Corn-Planters; and I do hereby declare that the following is a full, clear, and exact description thereof, which will enable others skilled in the art to which it appertains to make and use the same, reference being had to the accompanying drawings, and to the letters of reference marked thereon, which form a part of this specification.

This invention relates to improvements in corn-planters; and consists in the combination and construction of parts, hereinafter fully described and set forth in the claims hereto annexed.

In the accompanying drawing, Figure 1 is a top view of a seed-box and its contained seed-measuring mechanism. Fig. 2 is a vertical sectional view in the line $x\,x$ in Fig. 1. Fig. 3 is a vertical sectional view in the line $y\,y$ in Fig. 1. Fig. 4 is a perspective view of one of the cut-offs.

Referring to the parts by letters, A represents the seed-box, preferably circular in form, as shown in the drawings, and may be mounted on any suitable machine. B is the bottom plate of the box A, and has in one side an oblong perforation or slot, C, oblique to a radial line, and is preferably curved, as shown by dotted lines at Fig. 1. D is the seed-cup disk, mounted on a shaft, $d$, and may be given rotary motion by any suitable or desired devices. The upper face of the disk D is concave or depressed toward its center, as shown at Fig. 2, and has a series of oblong slots or seed-cups, E, each seed-cup nearly radial from the center of the disk. F G are partitions dividing the seed-box A into two separate compartments, H and I, one of which, H, embraces the discharge-opening C, and the other of which, I, contains the seed to be planted. The partition G does not extend quite down to the disk D, and is slotted vertically for the reception of a series of gravitating cut-offs, J, each of which is formed as shown at Fig. 4, and seated in the slotted partition G, as shown at Figs. 1 and 2, and with their lower ends beveled and extending below the partition G, and within close proximity to the disk D, as shown at Fig. 3. The upper ends of the cut-offs J have projections $j$, which rest upon the upper surface of the partitions G, and prevent their descending so as to rest upon the disk D. K is a guard to prevent the cut-offs J being thrown out of their seats in the partition G. L is a partition placed at a considerable distance above the disk D, and interposed in front of the partition G, to prevent too great crowding of the seed in the seed-box against the cut-offs J, where their lower ends project below the walls of the partition G. The disk D may be mounted so as to rotate either with or upon the shaft $d$.

In operation, the disk D is rotated in the direction shown by the arrow at Fig. 1, and the seed-cups E, passing through the seed in the chamber I, become charged with grains of seed. Some of the grains of seed may be thicker than their fellows and project above them, and the independent cut-offs J will facilitate the passage of such beneath their ends, in the evident manner, so that when the cups E have passed the partition G they will contain a single row of grains of seed, as shown by cup E' at Fig. 1. By the rotation of the disk D each cup E will be brought first with its outer end over the discharge-opening C, as shown by cup E', and thence all of its parts coincident with said opening until its inner end has passed over it, as shown by cup E'', thus allowing the grains of seed to fall one at a time, at regular intervals, through the opening C, to the throat of any ordinary seed tube or conductor, for conveying it to the ground. The seed-cups E are so arranged that as a preceding cup, E'', for instance, discharges its last-contained grain, its succeeding cup E' will present its first grain for discharge, and thus preserve a continuous and regular drilling or dropping of single seeds.

The upper surface of the disk D, being concave, will elevate the outer end of each cup E, and prevent the seeds contained therein, when it is passing over the discharge C, being thrown or sliding off and into the discharge on inclined surfaces, and from other causes.

Having thus described my invention, what I claim as new, and desire to secure by Letters Patent, is—

1. In a seed-planter, seed-cup plates D, having elongated seed-cups E, combined with an elongated discharge, C, substantially as and for the purposes specified.

2. The disk D, having elongated seed-cups E and a concave upper surface, combined with the discharge-opening C, substantially as described, and for the purpose specified.

3. The series of independent cut-offs J, combined with the disk D, having elongated seed-cups E, which extend the full width of the series of cut-offs, substantially as described, and for the purpose specified.

4. The series of independent cut-offs J, combined with the disk D, having elongated seed-cups E, which extend the full width of the series of cut-offs, and with correspondingly-elongated discharge-opening C, substantially as described, and for the purpose specified.

5. The slotted partition G, operating in combination with the series of gravitating cut-offs, having stop projections $j$, substantially as and for the purpose specified.

In testimony that I claim the foregoing as my own I affix my signature in presence of two witnesses.

ROBERT H. AVERY.

Witnesses:
W. H. PAGE,
THOS. B. MAGOFFIN.